(12) United States Patent
Galeotti et al.

(10) Patent No.: US 8,206,042 B2
(45) Date of Patent: Jun. 26, 2012

(54) ELECTRO-OPTIC DEVICE PACKAGES

(75) Inventors: Roberto Galeotti, Giussago (IT); Luigi Gobbi, Milan (IT); Mario Bonazzoli, Cremona (IT)

(73) Assignee: Oclaro (North America), Inc., San Jose, CA (US)

( * ) Notice: Subject to any disclaimer, the term of this patent is extended or adjusted under 35 U.S.C. 154(b) by 197 days.

(21) Appl. No.: 12/460,477

(22) Filed: Jul. 20, 2009

(65) Prior Publication Data

US 2009/0324166 A1 Dec. 31, 2009

Related U.S. Application Data

(63) Continuation of application No. 12/150,542, filed on Apr. 29, 2008, now Pat. No. 7,641,400.

(51) Int. Cl.
*G02B 6/42* (2006.01)
(52) U.S. Cl. ............................................. 385/92; 385/3
(58) Field of Classification Search ........................ None
See application file for complete search history.

(56) References Cited

U.S. PATENT DOCUMENTS

| | | | |
|---|---|---|---|
| 5,123,065 A | 6/1992 | Enochs | |
| 5,513,285 A * | 4/1996 | Kawashima et al. .......... | 385/16 |
| 6,661,084 B1 | 12/2003 | Peterson et al. | |
| 6,711,312 B1 | 3/2004 | Kornrumpf et al. | |
| 6,797,989 B2 * | 9/2004 | Bendelli et al. ................ | 257/99 |
| 6,976,795 B2 * | 12/2005 | Go et al. ......................... | 385/92 |
| 7,194,150 B2 * | 3/2007 | Sakane et al. .................... | 385/1 |
| 7,292,756 B2 * | 11/2007 | Moynihan et al. .............. | 385/49 |
| 7,304,377 B2 * | 12/2007 | Nakano .......................... | 257/700 |
| 7,641,400 B2 * | 1/2010 | Galeotti et al. .................. | 385/92 |
| 2002/0190359 A1 | 12/2002 | Shaw et al. | |
| 2002/0196997 A1 | 12/2002 | Chakravorty et al. | |
| 2003/0185480 A1 * | 10/2003 | Chen et al. ....................... | 385/1 |
| 2004/0100164 A1 | 5/2004 | Murata et al. | |
| 2004/0141699 A1 * | 7/2004 | Sato ............................... | 385/93 |
| 2004/0240804 A1 * | 12/2004 | Mahapatra et al. ............. | 385/94 |
| 2008/0085084 A1 | 4/2008 | Galeotti et al. | |
| 2008/0118202 A1 * | 5/2008 | Kato et al. ....................... | 385/14 |

FOREIGN PATENT DOCUMENTS

| | | |
|---|---|---|
| EP | 1 296 453 A2 | 3/2003 |
| GB | 2 308 894 A | 7/1997 |
| JP | 05-264831 | 10/1993 |
| JP | 2006-284838 | 10/2006 |
| JP | 2007-212531 | 8/2007 |

OTHER PUBLICATIONS

European Patent Application No. 09154731.5 Search Report (Aug. 14, 2009).

* cited by examiner

*Primary Examiner* — Mike Stahl
(74) *Attorney, Agent, or Firm* — Patterson & Sheridan, L.L.P.

(57) ABSTRACT

A package design for electro-optic devices has been developed in which the substrate supporting the electro-optic element serves also as the base of the device housing. The electro-optic element is flip-chip bonded to the substrate. In a preferred embodiment the substrate is a multi-level wiring board.

12 Claims, 2 Drawing Sheets

ELECTRO-OPTIC DEVICE PACKAGES

RELATED APPLICATION

This application is a continuation of application Ser. No. 12/150,542, filed Apr. 29, 2008 now U.S. Pat. No. 7,641,400.

FIELD OF THE INVENTION

This invention relates to packaging photonic devices, and more specifically to packaging electro-optic devices such as modulators, switches, couplers, etc.

BACKGROUND OF THE INVENTION (Portions of the technical material contained in this section may not be prior art.)

Packaging photonic devices requires materials and designs that take account of the performance of the photonic device under a variety of environmental conditions. Most of these devices have optical inputs and or optical outputs coupled to waveguides in the device. This requires optical alignment tolerances that vary depending on the use environment. Controlling the effects of thermal expansion is typically a main consideration. However, some devices are provided with hermetic housings for protection against changing ambients. These and other factors have influenced photonic device packaging in the direction of complex and expensive packages. Electro-optic photonic devices add another level of complexity.

A common package for an electro-optic device is a metal container. Similar package approaches use ceramic housings. In both cases the electro-optic device is completely contained, i.e. surrounded, by package material.

Some electro-optic device packages tend to be over-engineered for their intended purpose. There is an advantage in recognizing when electro-optic device packages can be simplified without compromising performance for a given application. Simplifying photonic packages may lead directly to significant cost reductions.

BRIEF STATEMENT OF THE INVENTION

A new package design for electro-optic devices has been developed in which the substrate supporting the electro-optic element serves also as the base of the device housing. The electro-optic element is flip-chip bonded to the substrate. In a preferred embodiment the substrate is a multi-level printed circuit board.

BRIEF DESCRIPTION OF THE DRAWING

The invention may be better understood when considered in conjunction with the drawing in which.

DETAILED DESCRIPTION OF THE INVENTION

The invention will be described in detail using, as an example of an electro-optic device, a Mach-Zehnder type electro-optic modulator. However, it should be understood that the invention may apply to any type or form of electro-optic modulator or any type of electro-optic device, such as switches, couplers, splitters, phase modulators, etc.

Figure 1:
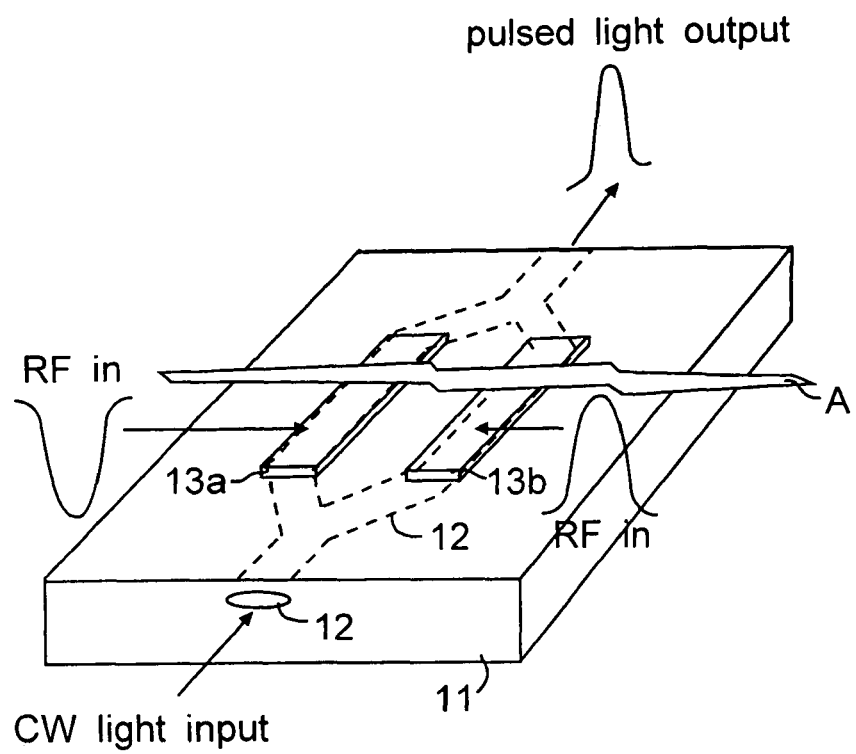
FIG. 1 is a perspective representation of an electro-optic modulator showing a typical surface geometry.

Referring to FIG. 1, an electro-optic element comprising a substrate 11 is shown with a diffused waveguide 12 formed in the substrate. The substrate 11 is shown split at A to indicate a high length-to-width aspect ratio as is typical for this device. The electro-optic substrate is preferably lithium niobate due to the highly developed technology existing for this material. However, other electro-optic materials may be substituted. The waveguide 12 may be formed by titanium diffusion, preferably using the known double diffusion process. Details of the formation of the waveguide are omitted here for simplicity. Techniques for forming suitable waveguides in lithium niobate and other electro-optic materials are well known in the art. The waveguide 12 of FIG. 1 is split to form two active interaction regions as shown. The strip electrodes 13a and 13b overlie the interactive electro-optic regions. By impressing opposite phased voltages in the two striplines, as schematically represented by the RF inputs in FIG. 1, the continuous wave optic input in each of the two arms of the Mach-Zehnder can be made to be phase matched or unmatched when the two arms are recombined. The split optical signal, when recombined, is either enhanced or extinguished resulting in a pulsed optical output with a frequency determined by the RF input signals. Mach-Zehnder electro-optic modulators are well known in the art. For more details, see Ivan P. Kaminlow and Thomas L. Koch, Optical Fiber Telecommunications IIIB, San Diego, Calif.: Academic Press, 1997, ch. 9, which, for those details, is incorporated herein by reference.

A barrier layer (not shown) may be used between the lithium niobate crystal 11 and electrodes 13a and 13b. The barrier layer may be $SiO_2$ or other suitable insulating material.

Typical dimensions for the drive electrodes are:
thickness: 5-20 μm
width of stripline: 5-20 μm
thickness of barrier layer: 0.5-2.0 μm The distance separating the waveguides is controlled by a desire to minimize the waveguide angles, and keep the overall footprint small. The material of the drive electrodes is preferably gold, although other materials, e.g. TiPtAu, TiPdAu, may be used.

Figure 2:
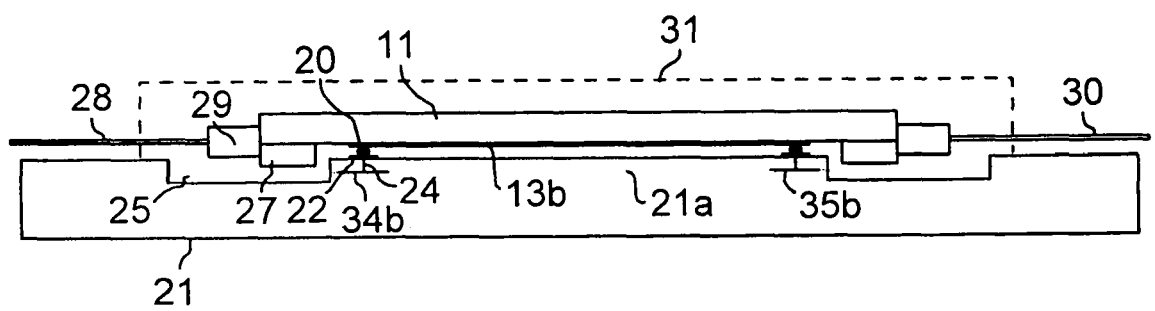
FIG. 2 is a schematic view of the electro-optic device package according to the invention.

FIG. 2 shows the electro-optic element of FIG. 1 mounted on and electrically connected to substrate 21. The substrate is preferably a molded resin laminate such as FR4. FR4 printed circuit boards (PCBs) are widely used and provide an effective mounting and interconnection substrate, as well as good high frequency performance. The latter is important for state of the art electro-optic devices that operate at Gb frequencies. Other similar substrates may be used, for example, the TMM series of high frequency PCBs available from Rogers Corporation. The laminated PCB described here is a multi-level PCB, and a multi-level PCB is preferred for reasons that will become apparent. However, it should be understood that a single level PCB may be used as well.

The interconnection arrangement shown in FIG. 2, and described in detail below, is a flip-chip assembly. For reasons mentioned below, this type of assembly is preferred. However, a variety of alternative methods may be used for mounting the electro-optic elements on the laminated PCB. For example, the electro-optic element may be mounted using TAB or ribbon bonding, adhesive bonding the bottom of the electro-optic element to the PCB and wire bonding to the top interconnections, etc.

Referring again to FIG. 2, the lithium niobate crystal 11 is attached and interconnected to PCB 21 with gold solder bumps 20. Elements on the right side of the figure are common with corresponding elements on the left side of the figure, except for input optical fiber 28 and output optical fiber 30, and runners 34b and 35b. Solder bumps 20 are soldered to solder bond pads 22 on substrate 21, and to runners 13a (FIG. 1) and 13b on the electro-optic device 11. Runner 13b appears in the view of FIG. 2. The solder bond pads 22 are on the top interconnect level (surface). Substrate 21 has lower interconnect level 21a, with interconnect runner 34b is on the lower interconnect level. Connections between the solder bond pads 22 and the lower level runners 34b and 35b are made through interlevel vias 24. Although two interconnect levels of the multi-level printed circuit board (MLPCB) are shown here, more interconnect levels and more complex interconnections may be used.

An especially useful feature of this electro-optic device package are the recesses 25. These provide access to the waveguide 12 (FIG. 1), and facilitate coupling the optical fibers to the electro-optic element 11. Support blocks 27 may be added to provide a mounting surface for ferrules 29. Recesses, and other topological features, on substrate 21 are easily fabricated in a molded epoxy laminate PCB.

The basic elements of the housing for the electro-optic element in FIG. 2 are a bottom, the laminated resin MLPCB, and a cover. The cover is shown at 31.

Figure 3:
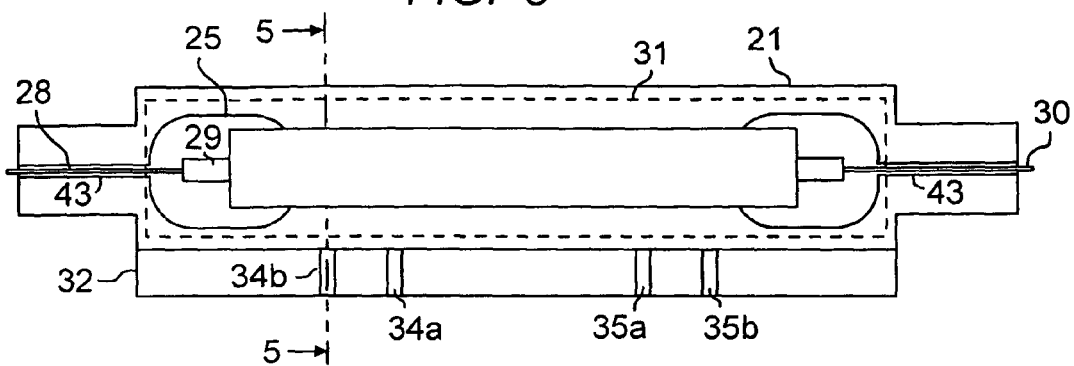
FIG. 3 is a plan view of the electro-optic device package of FIG. 2.

FIG. 3 shows a plan view of the packaged electro-optic device. The cover of the package is removed for this view. The position of the cover is shown in phantom at 31. FIG. 3 also shows recesses 25 in more detail. Optionally, additional recesses 43 may be provided as channels for the optical fibers 28 and 30.

Substrate 21 is preferably provided with ledge portion 32 to accommodate the electrical I/O leads for the package. The I/O leads are 34a and 35a for runner 13a, and 34b and 35b for runner 13b.

Figure 4:
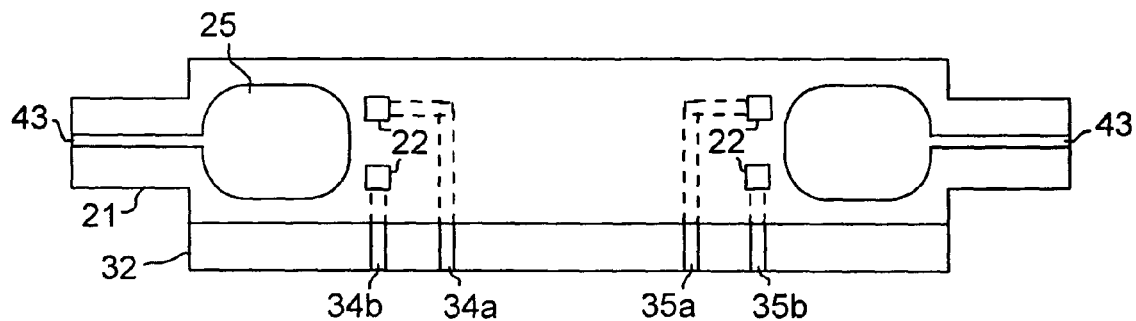
FIG. 4 is a plan view of the electro-optic device substrate of FIG. 2.

FIG. 4 shows the substrate with the electro-optic device removed. The contact pads 22 (see also FIG. 2) are formed on the surface of the substrate. The buried conductors on the lower interconnect level of the MLPCB, interconnecting the bond pads to the I/O leads 34a, 35a, and 34b, 35b, are shown in phantom.

Figure 5:
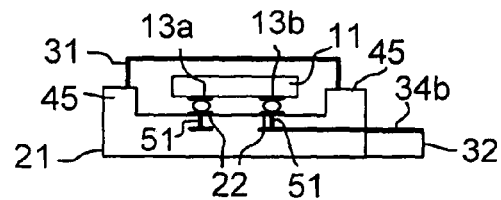
FIG. 5 is a section view through 5-5 of FIG. 3.

FIG. 5 shows a transverse section of the electro-optic device package through 5-5 of FIG. 3, and shows the package with cover 31 attached. The cover may be any suitable material, e.g., metal, ceramic, etc., but preferably is plastic. The cover may be attached by a suitable method, e.g., epoxy adhesive. FIG. 5 also shows a shoulder 45 on which the cover rests. The shoulder may be molded in the laminate board in the same manner and operation as recesses 25. The figure is not to scale and the height of shoulder 45 is exaggerated for clarity. The shoulder serves to protect the interface and the interconnections between the electro-optic element and the substrate. It also provides a shoulder to accommodate formation of the channels 43 shown in FIGS. 3 and 4.

In some IC or photonic packaging it is conventional to provide a polymer filling material or polymer encapsulant for the package, or for components within the package. The filling material is used to provide additional package integrity and environmental protection. However, we have recognized that high frequency performance can be degraded by encapsulants or filling materials. Accordingly, the package shown in FIG. 5 is preferably free of filling material or encapsulants.

As described above a main feature of the electro-optic package of the invention is that in the completed package the laminated resin substrate serves as the bottom of the package. Stated another way, the housing for the electro-optic device consists of a bottom and a cover, wherein the bottom is a laminated resin, preferably a MLPCB having at least two levels, and the electro-optic element is attached to the top level of the MLPCB. The MLPCB preferably has a second interconnection level having a ledge extending from the side of the MLPCB as shown in FIG. 5. The ledge provides a convenient access for electrical connections to the next interconnect level, typically a system interconnect board.

The electro-optic element may be defined as a body of electro-optic material with an optical waveguide and associated electrodes for impressing an electric field on the body of electro-optic material, and further having optical connectors for coupling a lightwave signal into the optical waveguide.

Recognizing that the laminated resin serves as the bottom of the completed package, there are no added electrical connections made after the electro-optic element is flip chip mounted on the laminated resin substrate. That means that the electro-optic element may be given a final electrical test at the board level, with no need for additional testing after the device is packaged. In conventional electro-optic device packaging the electro-optic element is often electrically tested prior to packaging, then again after packaging to ensure that electrical connections made during packaging are not defective.

While lithium niobate is a preferred electro-optic material, and is widely used in electro-optic devices, a wide variety of electro-optic effects and electro-optic materials may be substituted. For example, lithium tantalate, barium titanate, potassium tantalate niobate, barium sodium nitrate, bismuth silicon oxide, bismuth germanium oxide, etc. may be used. Electro-optic effects occur also in ammonium dihydrogen phosphate, potassium dyhydrogen phosphate, and in their deuterated forms. Pockels effect devices have been made with lithium calcium aluminum hexafluoride, and lithium strontium aluminum hexafluoride Research efforts have been devoted to organic electro-optic materials such as electro-optic chromophores, for example, 2-dicyanomethylen-3-cyano-4-{2-[E-(4-N,N-di(2-acetoxyethyl)-amino)-phenylene-(3,4-dibutyl)thien-5]-E-vinyl}-5,5-dimethyl-2,5-dihydrofuran. Strained silicon shows electro-optic behavior, and even poled glasses show electro-optic effects. So the choice for the electro-optic element is very wide.

Many of the electro-optic devices based on these materials operate in free space, i.e. an unconfined optical beam is directed through a bulk body of electro-optic material. Preferred for this invention are optical fiber electro-optic devices wherein the electro-optic material has a confined optical path, i.e. an optical waveguide, and the optical input and output comprise optical fibers.

Various additional modifications of this invention will occur to those skilled in the art. All deviations from the specific teachings of this specification that basically rely on the principles and their equivalents through which the art has been advanced are properly considered within the scope of the invention as described and claimed.

The invention claimed is:
1. An electro-optic device package comprising:
an electro-optic element comprising an electro-optic body having a top surface and a bottom surface, with an optical waveguide formed in the top surface, an optical fiber input to the optical waveguide, an optical fiber output from the optical waveguide, and electrodes on the top surface of the electro-optic body for impressing an electric field on the optical waveguide, wherein the optical fiber input is located at one end of the electro-optic body and the optical fiber output is located at an opposite end of the electro-optic body; and a housing enclosing the electro-optic element, the housing comprising a bottom and a cover, with the bottom consisting of a laminated resin substrate, with the electro-optic element bonded to the laminated resin substrate, and with the cover attached to the bottom.

2. The electro-optic device package of claim 1 wherein the laminated resin substrate comprises a multi-level printed circuit board (MLPCB) with a top level, and at least one lower electrical interconnection level.

3. The electro-optic device package of claim 2 wherein the electro-optic body is flip-chip mounted on the top level.

4. The electro-optic device package of claim 2 wherein the electrodes are bonded to the top level of the MLPCB.

5. The electro-optic device package of claim 4 further comprising printed circuit runners on the at least one lower electrical interconnection level, with the printed circuit runners electrically interconnected to the electrodes bonded to the top level of the MLPCB.

6. The electro-optic device package of claim 1 wherein the electro-optic body comprises lithium niobate.

7. The electro-optic device package of claim 6 wherein the cover comprises a polymer material.

8. The electro-optic device package of claim 7 wherein the cover is attached with adhesive.

9. The electro-optic device package of claim 1 wherein the laminated resin substrate is FR-4.

10. The electro-optic device package of claim 1 wherein the housing is not filled with polymer material.

11. An electro-optic device package comprising:

an electro-optic element comprising an electro-optic body having a top surface and a bottom surface, with an optical waveguide formed in the top surface, an optical fiber input to the optical waveguide, an optical fiber output from the optical waveguide, and electrodes on the top surface of the electro-optic body for impressing an electric field on the optical waveguide; and a housing enclosing the electro-optic element, the housing comprising a cover and a bottom consisting of a laminated resin substrate, wherein the cover is attached to the bottom such that the cover does not extend beyond outer edges of an upper surface of the laminated resin substrate.

12. The electro-optic device package of claim 11, wherein a top surface of the cover is substantially parallel to the upper surface of the laminated resin substrate.

* * * * *